United States Patent
Nakatani et al.

(10) Patent No.: US 9,671,980 B2
(45) Date of Patent: Jun. 6, 2017

(54) IMAGE FORMING APPARATUS THAT PROPOSES SUBSTITUTION OF OPERATIONS OR SERIES OF JOBS BY WORKFLOW TO USER

(71) Applicant: KYOCERA DOCUMENT SOLUTIONS INC., Osaka (JP)

(72) Inventors: Ryusuke Nakatani, Osaka (JP); Makoto Kowaka, Osaka (JP); Takashi Murakami, Osaka (JP); Yosuke Nakazato, Osaka (JP); Kazuki Dozen, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/174,554

(22) Filed: Jun. 6, 2016

(65) Prior Publication Data

US 2016/0364184 A1   Dec. 15, 2016

(30) Foreign Application Priority Data

Jun. 11, 2015   (JP) .................................. 2015-117966

(51) Int. Cl.
*G06F 3/12*   (2006.01)
*H04N 1/00*   (2006.01)

(52) U.S. Cl.
CPC .......... *G06F 3/1204* (2013.01); *G06F 3/1258* (2013.01); *G06F 3/1263* (2013.01); *G06F 3/1273* (2013.01); *G06F 3/1275* (2013.01); *H04N 1/00411* (2013.01); *H04N 2201/0094* (2013.01)

(58) Field of Classification Search
CPC .... G06F 3/1204; G06F 3/1258; G06F 3/1263; G06F 3/1273; G06F 3/1275; H04N 1/00411; H04N 2201/0094
See application file for complete search history.

(56) References Cited

U.S. PATENT DOCUMENTS

2007/0013943 A1*   1/2007   Sawayanagi .......... G06F 3/1204
                                                        358/1.15

FOREIGN PATENT DOCUMENTS

| JP | 2012-221505 A | 11/2012 |
| JP | 2015-064686 A | 4/2015 |
| JP | 2015-065536 A | 4/2015 |

* cited by examiner

*Primary Examiner* — Iriana Cruz
(74) *Attorney, Agent, or Firm* — Li & Cai Intellectual Property (USA) Office

(57) ABSTRACT

An image forming apparatus includes: a display device that displays an operation screen with respect to a user; an input device that receives an input operation from the user; a storage device; a work amount log table management circuit that specifies, for each job, an operation type and required time of each of a series of user operations made before executing the job, and stores the operation type and the required time in the storage device as a work amount log; and a work amount calculation circuit that reads out the work amount log from the storage device, specifies, based on the operation type in the work amount log, operations that can be substituted by a workflow that uses an operation aid function registered in the storage device out of the series of user operations, and proposes the substitution of the specified operations by the workflow to the user.

10 Claims, 11 Drawing Sheets

Operation: (1) Job selection: Copy → (2) Tab shift: Simple setting → Layout/edit →
(3) Setting value selection: None → 2in1

When this operation is registered in program, work amount can be cut as follows.
Do you wish to register this operation in program?

20 seconds → 10 seconds

[ No ]   [ Yes ]

FIG.5

| Job ID | Start time | End time | Operation type | Target | FROM | TO | Result |
|---|---|---|---|---|---|---|---|
| 001 | 10:00:00 | 10:00:05 | Job selection | Copy | - | - | - |
| 001 | 10:00:05 | 10:00:10 | Tab shift | - | Simple setting | Layout/edit | - |
| 001 | 10:00:10 | 10:00:15 | Setting value selection | Intensive | None | 2 in 1 | - |
| 001 | 10:00:15 | 10:00:20 | Job execution | - | - | - | OK |
| 002 | 10:05:00 | 10:05:05 | Job selection | Transmit | - | - | - |
| 002 | 10:05:10 | 10:05:15 | Address input method selection | Direct input | - | - | - |
| 002 | 10:05:20 | 10:05:25 | Address input | Email | - | xxx@xxx.com | - |
| 002 | 10:05:25 | 10:05:30 | Job execution | - | - | - | OK |
| ... | | | | | | | |

FIG.6

| Job ID | Device ID | Start time | End time | Operation type | Target | From | To | Result | |
|---|---|---|---|---|---|---|---|---|---|
| ... | | | | | | | | | |
| 002 | AAA | 10:06:10 | 10:06:15 | Job selection | Box save | - | - | - | ~L1 |
| 002 | AAA | 10:06:15 | 10:06:20 | Setting value selection | Stamp setting | None | Date | - | ~L2 |
| 002 | AAA | 10:06:20 | 10:06:25 | Job execution | - | - | - | OK | ~L3 |
| 003 | AAA | 10:07:00 | 10:07:05 | Job selection | Send | - | - | - | ~L4 |
| 003 | AAA | 10:07:05 | 10:07:10 | Address input method selection | Address book selection | - | - | - | ~L5 |
| 003 | AAA | 10:07:10 | 10:08:00 | Address input | Email | - | joushi@tst.com | - | ~L6 |
| 002 | AAA | 10:09:00 | 10:09:05 | Job execution | - | - | - | OK | ~L7 |
| 004 | AAA | 10:10:00 | 10:10:05 | Job selection | Box printing | - | - | - | ~L8 |
| 004 | AAA | 10:10:20 | 10:10:25 | Job execution | - | - | - | OK | ~L9 |
| ... | | | | | | | | | |

FIG.10

| Job ID | Device ID | Start time | End time | Operation type | Target | From | To | Result | |
|---|---|---|---|---|---|---|---|---|---|
| ... | | | | | | | | | |
| 010 | AAA | 10:06:10 | 10:06:15 | Job selection | FAX | - | - | - | ~L10 |
| 010 | AAA | 10:06:10 | 10:06:15 | Address input method selection | Address book selection | - | - | - | ~L11 |
| 010 | AAA | 10:06:15 | 10:07:00 | Address input | FAX | - | Headquarters office (XXX-XXXXX) | - | ~L12 |
| 010 | AAA | 10:07:05 | 10:07:08 | Job execution | - | - | - | OK | ~L13 |
| 011 | BBB | 10:10:00 | 10:10:05 | Job selection | Reception/ save | - | - | - | ~L14 |
| 011 | BBB | 10:10:20 | 10:10:25 | Job execution | - | - | - | OK | ~L15 |
| 012 | BBB | 10:11:00 | 10:11:05 | Job selection | Box transmission | - | - | - | ~L16 |
| 012 | BBB | 10:11:05 | 10:11:10 | Address input method selection | Address book selection | - | - | - | ~L17 |
| 012 | BBB | 10:11:10 | 10:11:00 | Address input | Email | - | joushi@ tst.com | - | ~L18 |
| 012 | BBB | 10:11:00 | 10:11:05 | Job execution | - | - | - | OK | ~L19 |
| ... | | | | | | | | | |

FIG.11

IMAGE FORMING APPARATUS THAT PROPOSES SUBSTITUTION OF OPERATIONS OR SERIES OF JOBS BY WORKFLOW TO USER

INCORPORATION BY REFERENCE

This application claims the benefit of Japanese Priority Patent Application JP 2015-117966 filed Jun. 11, 2015, the entire contents of which are incorporated herein by reference.

FIELD

The present disclosure relates to an image forming apparatus (MFP; Multifunction Peripheral) that receives a setting operation that is input to cause the image forming apparatus to perform a specified process.

BACKGROUND

To perform a process, a typical image forming apparatus including various functions receives operations for various settings with respect to the image forming apparatus from a user. When instructing a complex process to the typical image forming apparatus, the user makes a large number of setting operations. It is desirable to shorten a time required for a setting that the user performs to instruct a series of process.

SUMMARY

According to an embodiment of the present disclosure, there is provided an image forming apparatus, including: a display device that displays an operation screen with respect to a user; an input device that receives an input operation made by the user; a storage device; a work amount log table management circuit that specifies, for each job, an operation type and a required time of each of a series of user operations that has been made before executing the job, and stores the operation type and the required time in the storage device as a work amount log; and a work amount calculation circuit that reads out the work amount log from the storage device, specifies, based on the operation type in the work amount log, operations that can be substituted by a workflow that uses an operation aid function registered in the storage device out of the series of user operations, and proposes the substitution of the specified operations by the workflow to the user.

In the image forming apparatus according to the embodiment of the present disclosure, the operation aid function may be a workflow function that includes enabling setting values to be input to a plurality of setting items of a plurality of jobs by one user operation with respect to a workflow key, and executing the plurality of jobs in a specific order.

Therefore, by proposing a workflow in which a plurality of jobs are combined via a plurality of image forming apparatuses, it is possible to shorten a time required for a setting that the user performs to instruct a series of process.

These and other objects, features and advantages of the present disclosure will become more apparent in light of the following detailed description of best mode embodiments thereof, as illustrated in the accompanying drawings.

BRIEF DESCRIPTION OF FIGURES

FIG. 5 is a diagram illustrating an example of an address designation screen for a transmission function;

FIG. 6 is a diagram illustrating an example of a work amount log table 42;

FIG. 10 is a diagram illustrating an example of a work amount log table 42b for extracting a series of jobs and proposing it as one workflow to a user; and FIG. 11 is a diagram illustrating an example of the work amount log table 42b for extracting a series of jobs and proposing it as one workflow to the user.

DETAILED DESCRIPTION

Hereinafter, embodiments of the present disclosure will be described with reference to the drawings.

First Embodiment

Figure 1:
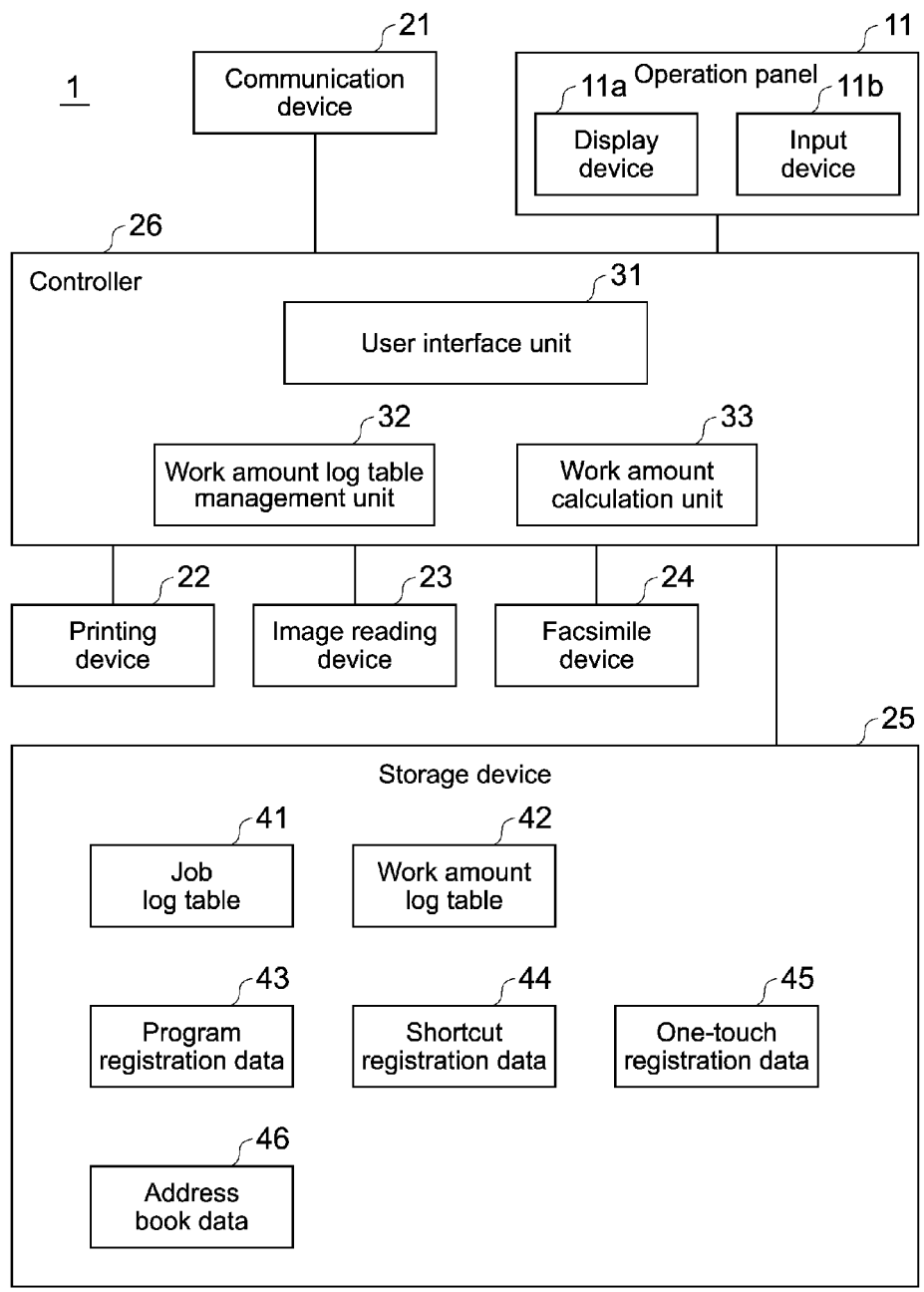
FIG. 1 is a diagram illustrating a functional block configuration of an image forming apparatus 1 according to a first embodiment of the present disclosure.

FIG. 1 is a diagram illustrating a functional block configuration of an image forming apparatus 1 as an example of an image forming apparatus according to a first embodiment of the present disclosure.

In this embodiment, the image forming apparatus 1 shown in FIG. 1 is a multifunction peripheral including a printing function, an image reading function, and a facsimile function. The image forming apparatus 1 includes an operation panel 11, a communication device 21, a printing device 22, an image reading device 23, a facsimile device 24, a storage device 25, and a controller 26.

The operation panel 11 includes a display device 11a such as a liquid crystal display and an input device 11b such as a touch panel. The operation panel 11 displays an operation screen with respect to a user and detects input operations made by the user.

Figure 2:
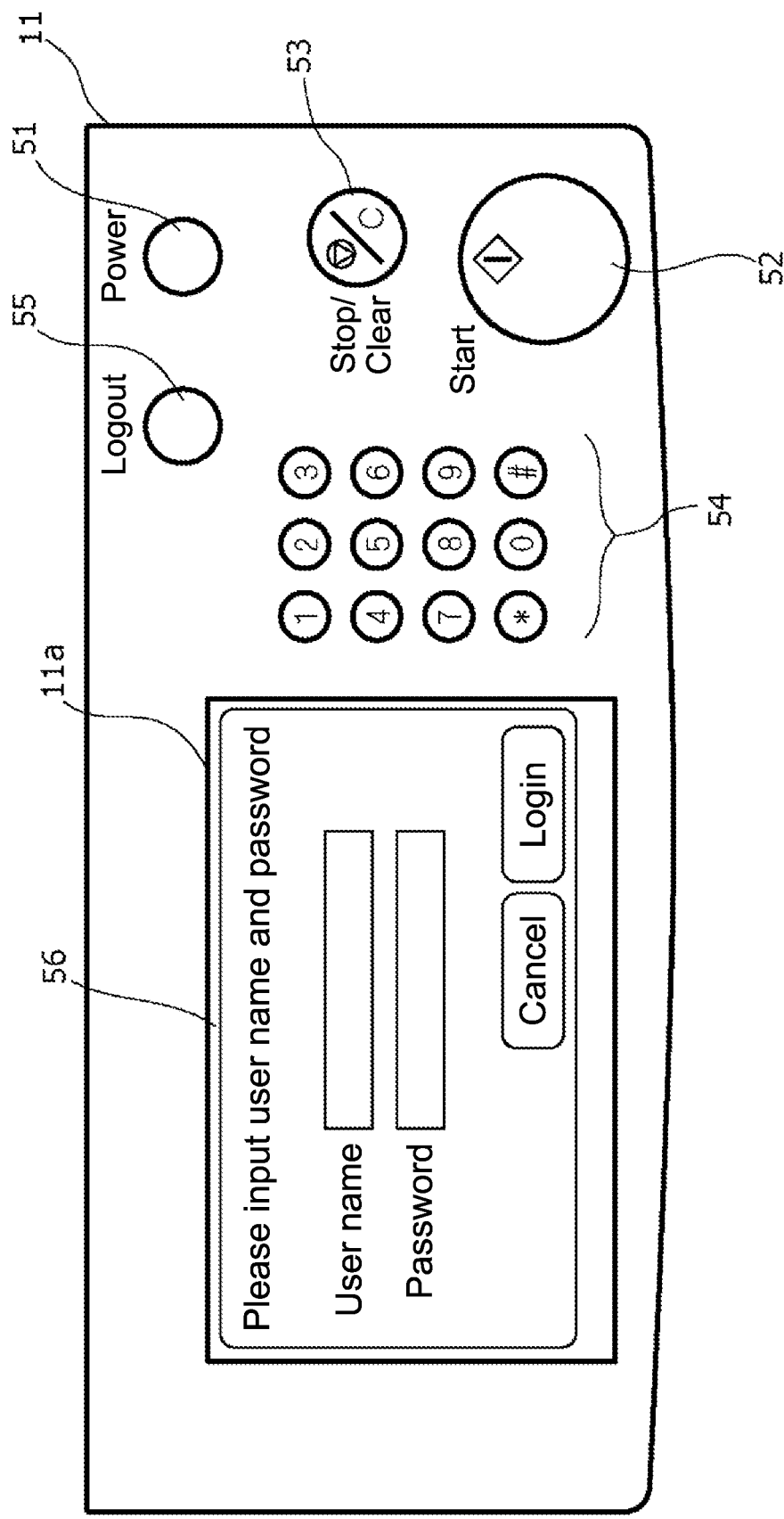
FIG. 2 is a diagram illustrating a front view of an operation panel of the image forming apparatus.

FIG. 2 is a diagram illustrating a front view of the operation panel 11 of the image forming apparatus 1. The operation panel 11 shown in FIG. 2 includes hard keys 51 to 55 and a touch panel 56 as the input device 11b. The hard key 51 is a power key, the hard key 52 is a start key, the hard key 53 is a stop/clear key, the hard key 54 is a numeric keypad, and the hard key 55 is a logout key. The touch panel 56 is provided on a front surface of the display device 11a.

Further, the communication device 21 is a device that is connectable to a host apparatus (not shown) via a network and the like and performs data communication according to a predetermined communication protocol.

The printing device 22 is a built-in device that prints a script image on a printing paper by an electrophotographic system, for example.

The image reading device 23 is a built-in device that optically reads a script image from a script and generates image data of the script image.

The facsimile device 24 is a built-in device that includes a reception function of receiving facsimile signals and converting the facsimile signals into image data and a transmission function of converting image data into facsimile signals and transmitting the facsimile signals.

The storage device 25 is a nonvolatile storage device such as a hard disk drive and a flash memory and stores data, programs, and the like.

The controller 26 includes a computer including a CPU (Central Processing Unit), a ROM (Read Only Memory), a RAM (Random Access Memory), and the like and operates as various processing units by the CPU loading a program stored in the ROM or the storage device 25 as a nontransitory computer readable recording medium to the RAM and executing it.

In the first embodiment, the controller 26 loads a program stored in the ROM or the storage device 25 as the nontransitory computer readable recording medium to the RAM and executes the program to operate as a user interface unit 31, a work amount log table management unit 32, and a work amount calculation unit 33.

The storage device 25 records a job log table 41 and a work amount log table 42 every time the image forming apparatus 1 executes a job.

As well as cause the display device 11a of the operation panel 11 to display a screen, the user interface unit 31 shifts the screen displayed on the display device 11a according to an input operation detected via the input device 11b of the operation panel 11.

Figure 3:
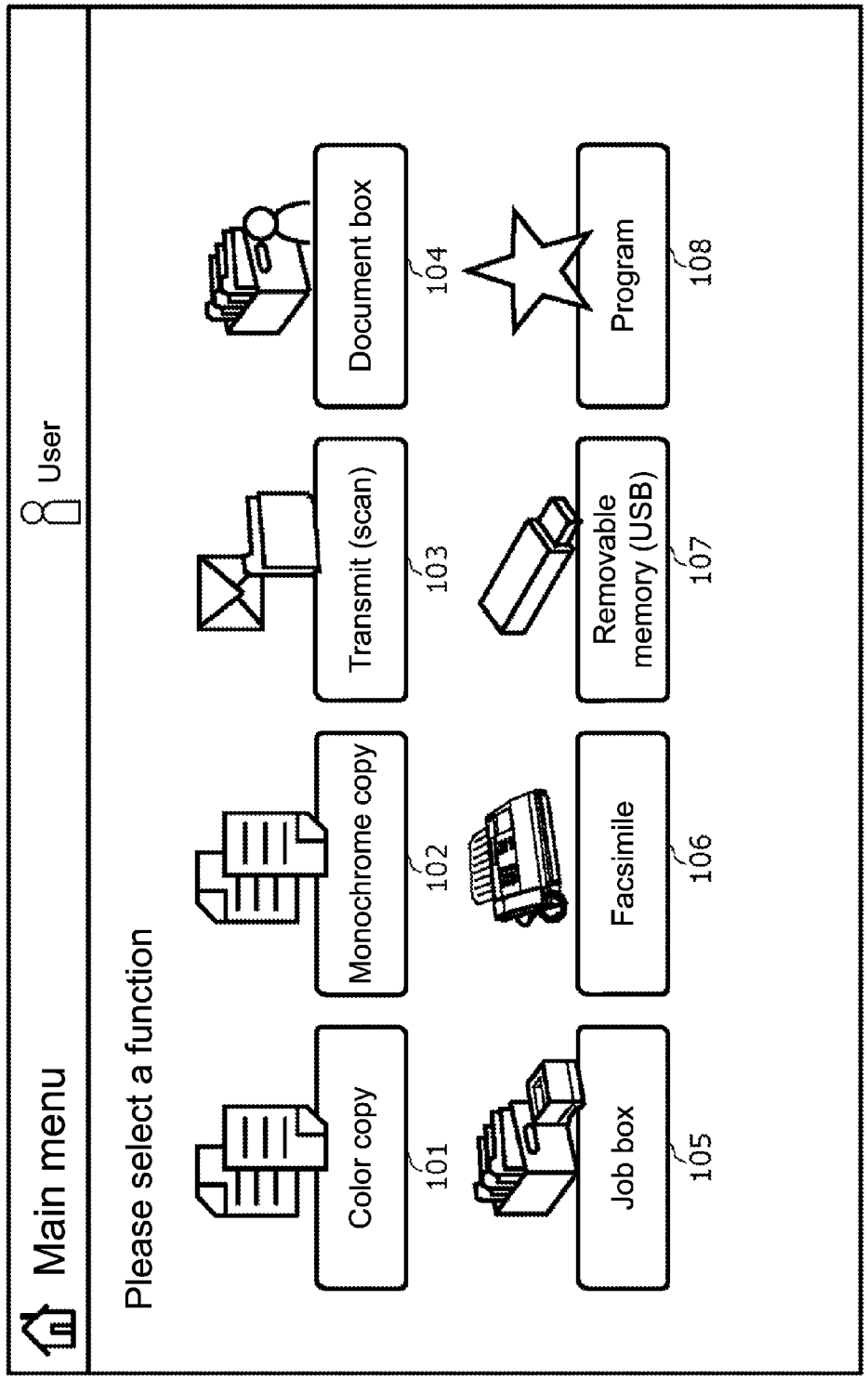
FIG. 3 is a diagram illustrating an example of a main menu screen.
Figure 4:
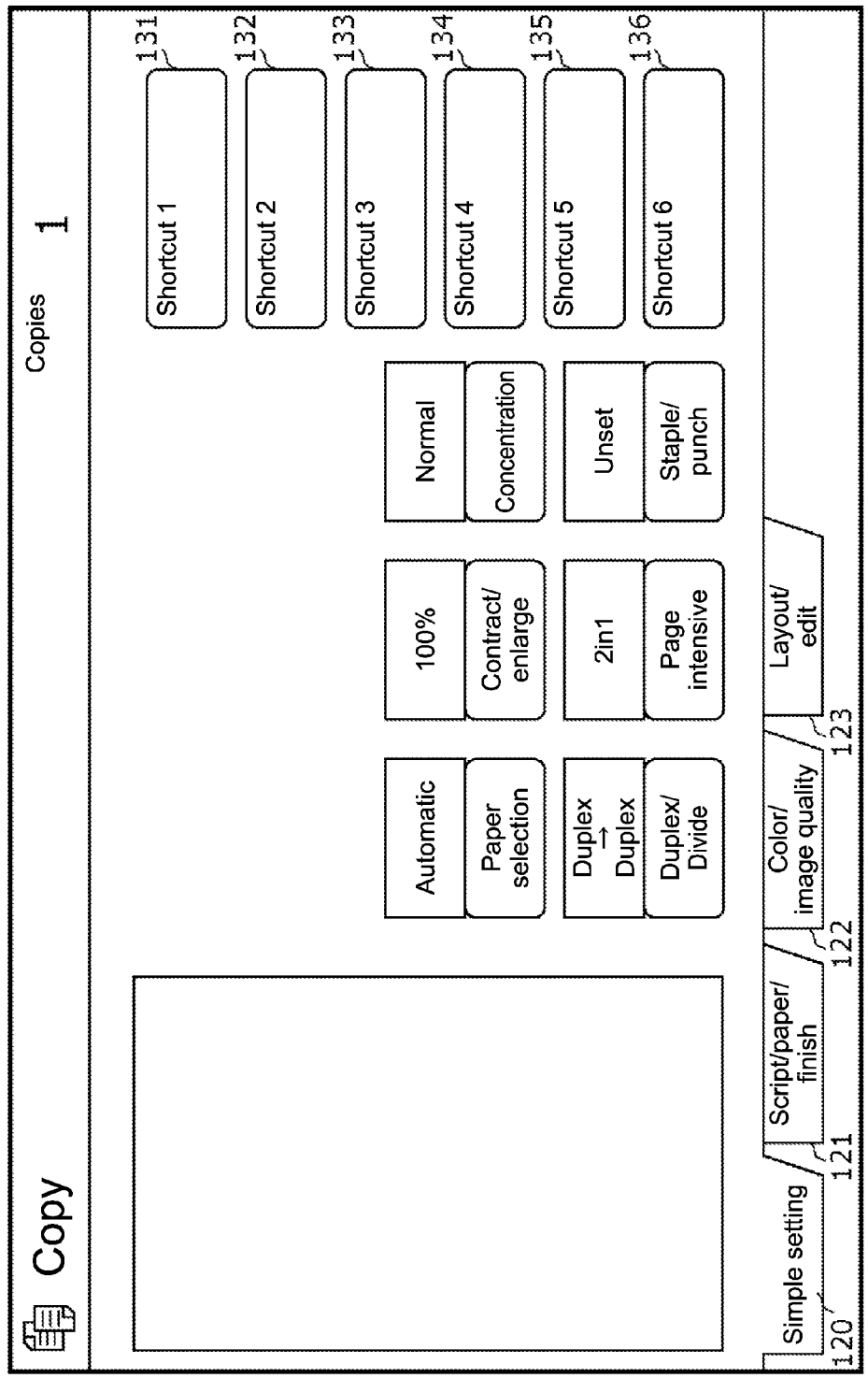
FIG. 4 is a diagram illustrating an example of a setting screen for a copy function.
Figure 5:
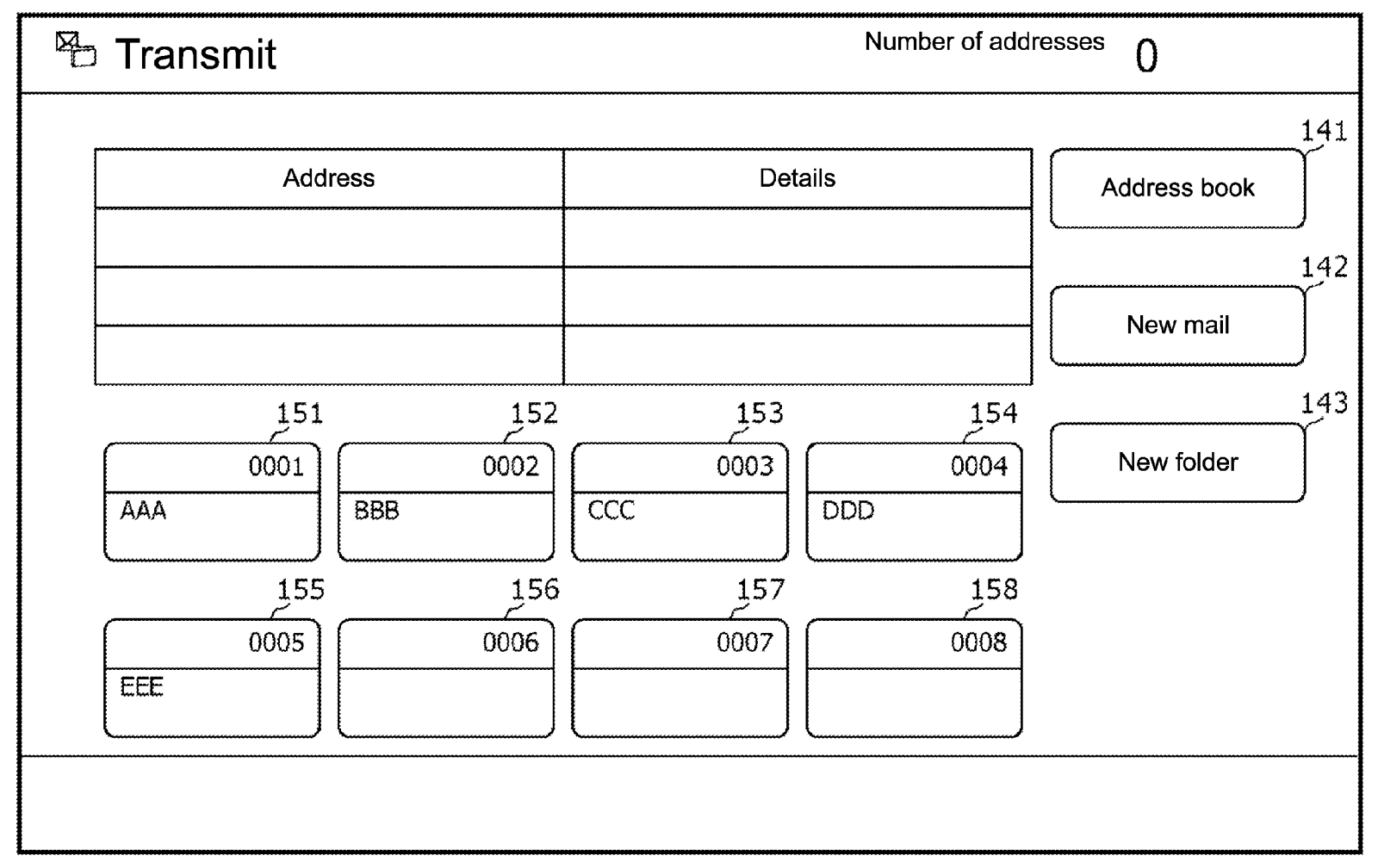

FIG. 3 is a diagram illustrating an example of a main menu screen. FIG. 4 is a diagram illustrating an example of a setting screen for a copy function. FIG. 5 is a diagram illustrating an example of an address designation screen for a transmission function.

In the image forming apparatus 1, after a user logs in on a login screen shown in FIG. 2, the user interface unit 31 first displays a main menu screen as that shown in FIG. 3. Displayed on the main menu screen are icons 101 to 107 for various functions including the copy function and the transmission function and a program icon 108 for displaying a program list screen.

Then, as the icon 101 or 102 for the copy function is pressed on the main menu screen shown in FIG. 3, the user interface unit 31 displays the setting screen for the copy function as that shown in FIG. 4. The setting screen for the copy function includes tabs 120 to 123 for respective setting items. Shortcut keys 131 to 136 are also displayed on the setting screen for the copy function.

Further, as the icon 103 for the transmission function is pressed on the main menu screen shown in FIG. 3, the user interface unit 31 displays the address designation screen for the transmission function as that shown in FIG. 5. Displayed on the address designation screen for the transmission function are an address book key 141 for selecting an address from address book data 46, a new mail key 142 for directly inputting an address, a new folder key 143, and one-touch keys 151 to 158.

The work amount log table management unit 32 specifies, for each job, an operation type and required time of each of a series of user operations that has been made before a job is executed and stores them as a work amount log in the storage device 25. The work amount log table 42 is stored separate from the job log table 41 indicating executed jobs.

The work amount calculation unit 33 reads out a work amount log, specifies, based on the operation type in the work amount log table 42, a part of a series of user operations that can be substituted by a substitutive user operation that uses an operation aid function, and calculates a required time before a job is executed in a case where the specified part is substituted by the substitutive user operation.

Further, the work amount calculation unit 33 calculates a difference between a required time before a job is executed without substitution by the substitutive user operation and a required time before a job is executed in the case where the specified part is substituted by the substitutive user operation, and displays the difference on the display device 11a.

In the first embodiment, the operation aid function corresponds to (a) a program function that enables setting values to be input to a plurality of setting items by one user operation with respect to the program key, (b) a shortcut function that enables the screen to jump to a predetermined setting screen by one user operation with respect to the shortcut key, (c) an address book function that displays a predetermined address list to prompt an address to be selected from the address list so as to enable the address to be input, by one user operation, and (d) a one-touch function that enables a predetermined address to be input by one user operation with respect to the one-touch key.

Then, program registration data 43, shortcut registration data 44, one-touch registration data 45, and address book data 46 are stored in the storage device 25 as registration data of the operation aid function. The program registration data 43 indicates a plurality of setting items associated with the program key for the program function and setting values thereof. The shortcut registration data 44 indicates a setting screen associated with the shortcut key for the shortcut function. The one-touch registration data 45 indicates an address associated with the one-touch key for the one-touch function.

FIG. 6 is a diagram illustrating an example of the work amount log table 42.

In the work amount log table 42, the "job ID" is a job ID of a job for which a work amount of the user is recorded in the work amount log table 42.

The "start time" indicates a time the user starts the setting operation, and the "end time" indicates a time the user starts the next operation (i.e., time after elapse of required time for that operation since "start time").

The "operation type" indicates a type of user operation, such as "job selection", "tab shift", "setting value selection", "address input method selection", "address input", and "job execution".

The "target" refers to a selected target in the case where the operation type is "selection" as in "job selection" and the like and refers to an input target in the case where the operation type is "input" as in "address input" and the like.

"FROM" indicates a pre-selection setting value in the case where the operation type is "selection" or a pre-input setting value in the case where the operation type is "input".

"TO" indicates a post-selection setting value in the case where the operation type is "selection" or a post-input setting value in the case where the operation type is "input".

The "result" indicates whether a job has been executed in the case where the operation type is "job execution", and "OK" indicates that the job has been executed.

Next, an operation of the image forming apparatus 1 will be described.

Every time a user makes an input operation using the operation panel 11 and executes a job, the work amount log table management unit 32 acquires information on the user operation made before that job is executed from the user interface unit 31, generates a work amount log based on that information, and stores it in the storage device 25.

After that, the manager user causes the image forming apparatus 1 to perform a process of automatically extracting a series of operations that can be substituted by the substitutive user operation from the work amount log table 42.

Figure 7:
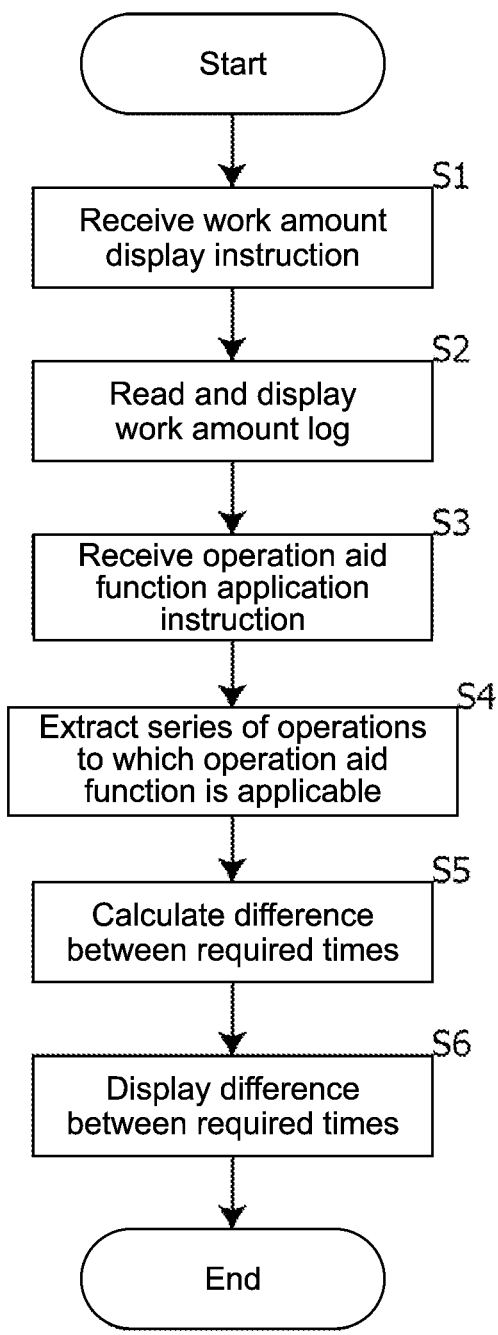
FIG. 7 is a flowchart of a process of calculating a quantitative effect of a substitutive user operation in the image forming apparatus.

FIG. 7 is a flowchart of a process of calculating a quantitative effect of the substitutive user operation in the image forming apparatus 1 shown in FIG. 1.

As the manager user makes an operation to instruct display of a work amount via the input device 11*b*, the work amount calculation unit 33 receives the operation (Step S1), reads out a work amount log, and displays it on the display device 11*a* (Step S2).

As the manager user checks the work amount log table 42 displayed on the display device 11*a* and makes an operation for an operation aid function application instruction via the input device 11*b*, the work amount calculation unit 33 receives the operation (Step S3).

The work amount calculation unit 33 makes an attempt to extract a series of operations that can be substituted by the substitutive user operations already registered as the registration data 43 to 45 and the address book data 46, out of the series of operations for each job, in the work amount log table 42 (Step S4).

When a series of operations that can be substituted by the registered substitutive user operations is extracted, the work amount calculation unit 33 calculates a required time before a job is executed in the case where the extracted operations are substituted by the substitutive user operations. At this time, a sum of a required time for operations other than the extracted operations and a preset required time for each of the substitutive user operations is calculated as the required time before a job is executed in the case of substitution by the substitutive user operations.

For example, in the case of the work amount log table 42 shown in FIG. 6, when the substitutive user operation for the program function is applied, the required time before a job is executed is calculated with a time required for the "setting value selection" and "tab shift" being 0.

Further, when the substitutive user operation for the shortcut function is applied, the required time before a job is executed is calculated with a time required for the operation type "tab shift" right before the operation type "setting value selection" being 0.

Furthermore, when the substitutive user operation for the address book function is applied, the required time before a job is executed is calculated while a time required for the operation type "address input" is set as 0 and an average time required for the address book selection is added at the time an operation of the operation type "address input method selection" is made.

Moreover, when the substitutive user operation for the one-touch function is applied, the required time before a job is executed is calculated with a time required for each of the operation types "address input method selection" and "address input" being 0.

Then, the work amount calculation unit 33 calculates a difference between the required time obtained before the substitution by the substitutive user operation, that is, the required time before a job is executed, in the work amount log table 42 and the calculated required time (Step S5) and displays the difference on the display device 11*a* (Step S6).

It should be noted that when a series of operations that can be substituted by the registered substitutive user operations is not extracted, the work amount calculation unit 33 displays a notification to that effect on the display device 11*a*.

As described above, according to the first embodiment above, the work amount log table management unit 32 specifies, for each job, the operation type and required time of each of the series of user operations that has been made before a job is executed and stores them as a work amount log. The work amount calculation unit 33 reads out the work amount log, specifies, based on the operation type in the work amount log table 42, a part of the series of user operations that can be substituted by the substitutive user operation that uses the operation aid function, and calculates a required time before a job is executed in the case where the specified part is substituted by the substitutive user operation.

Accordingly, it is possible to quantitatively grasp an administrative cost (work amount of user) cut effect that can be obtained by the operation aid function.

Second Embodiment

In a second embodiment, at a time a general user ends a job, the work amount calculation unit 33 extracts, from the work amount log table 42, a series of operations that can be substituted by unregistered substitutive user operations, and displays an inquiry screen for inquiring the user whether to register the unregistered substitutive user operations together with the difference described above. Upon detecting an input operation indicating that the substitutive user operation is to be registered via the input device 11*b*, that substitutive user operation is additionally registered as the registration data 43 to 45 or the address book data 46.

Figure 8:
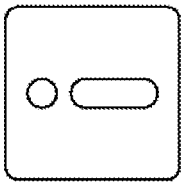
FIG. 8 is a diagram illustrating an example of an inquiry screen according to a second embodiment.

FIG. 8 is a diagram illustrating an example of the inquiry screen according to the second embodiment. As shown in FIG. 8, in the inquiry screen, operations that a user has made before a job is executed and difference information indicating a cut of a required time in the case where the operations are substituted by substitutive user operations are displayed (cut from 20 seconds to 10 seconds in FIG. 8). For example, when the "yes" key shown in FIG. 8 is pressed, the substitutive user operations are additionally registered.

It should be noted that when extracting a series of operations that can be substituted by unregistered substitutive user operations, the work amount calculation unit 33 specifies the number of times each of the user operations is made before a job is executed from the work amount log table 42. The work amount calculation unit 33 extracts an operation whose number of times is equal to or larger than a predetermined threshold value and does not extract an operation whose number of times is smaller than the predetermined threshold value. Specifically, while the inquiry screen is displayed when that number of times is equal to or larger than the predetermined threshold value, the inquiry screen is not displayed when that number of times is smaller than the predetermined threshold value.

As an operation to be registered as a substitutive user operation for the program function in particular, a series of setting operations with an appearance frequency that is equal to or larger than a predetermined threshold value in the work amount log table 42 may be extracted.

Further, in extracting a series of operations that can be substituted by unregistered substitutive user operations, the work amount calculation unit 33 extracts, when user operations of the same operation type are consecutively made for a predetermined number of times or more in the work amount log table 42, those consecutive user operations of the same operation type and displays an inquiry screen for those user operations.

Also in extracting a series of operations that can be substituted by unregistered substitutive user operations, the work amount calculation unit 33 extracts, when a required time of one user operation (e.g., address input) is equal to or larger than a predetermined threshold value in the work amount log table 42, that user operation and displays an inquiry screen for that user operation.

It should be noted that the operation aid function proposed in the inquiry screen is selected as follows, for example.

For example, when a setting of a setting item value that is equal to or larger than a predetermined threshold value is extracted, a substitutive user operation for the program function is selected.

Further, for example, when operations for a screen shift (including "tab shift" and "item selection") of a predetermined number of times or more are extracted, a substitutive user operation for the shortcut function is selected. In this case, a substitutive user operation for the shortcut function that targets the operation type "setting value selection" right after that operation is used.

Furthermore, for example, when the operation type "address input method selection" that targets "direct input" is extracted, a substitutive user operation for the one-touch function or a substitutive user operation for the address book function is selected.

Moreover, for example, when the operation type "address input method selection" that targets "address book" is extracted and a required time for the address input is equal to or larger than a predetermined threshold value, a substitutive user operation for the one-touch function is selected.

It should be noted that other structures and operations of the image forming apparatus 1a according to the second embodiment are similar to those of the first embodiment, so descriptions thereof will be omitted. In addition, the threshold values described above are set as appropriate by a manager user.

As described above, according to the second embodiment above, since unregistered substitutive user operations can be additionally registered, a reduction of subsequent user work amounts can be expected.

Third Embodiment

Next, a third embodiment will be described. The image forming apparatus 1b according to the third embodiment differs from those of the first and second embodiments described above in that a workflow via a plurality of image forming apparatuses is taken into account.

In the image forming apparatus 1b, when the jobs of, for example, copy, FAX transmission, and data save are carried out as a series of jobs for executing one task, the series of jobs can be handled as a workflow.

(Structure)

Figure 9:
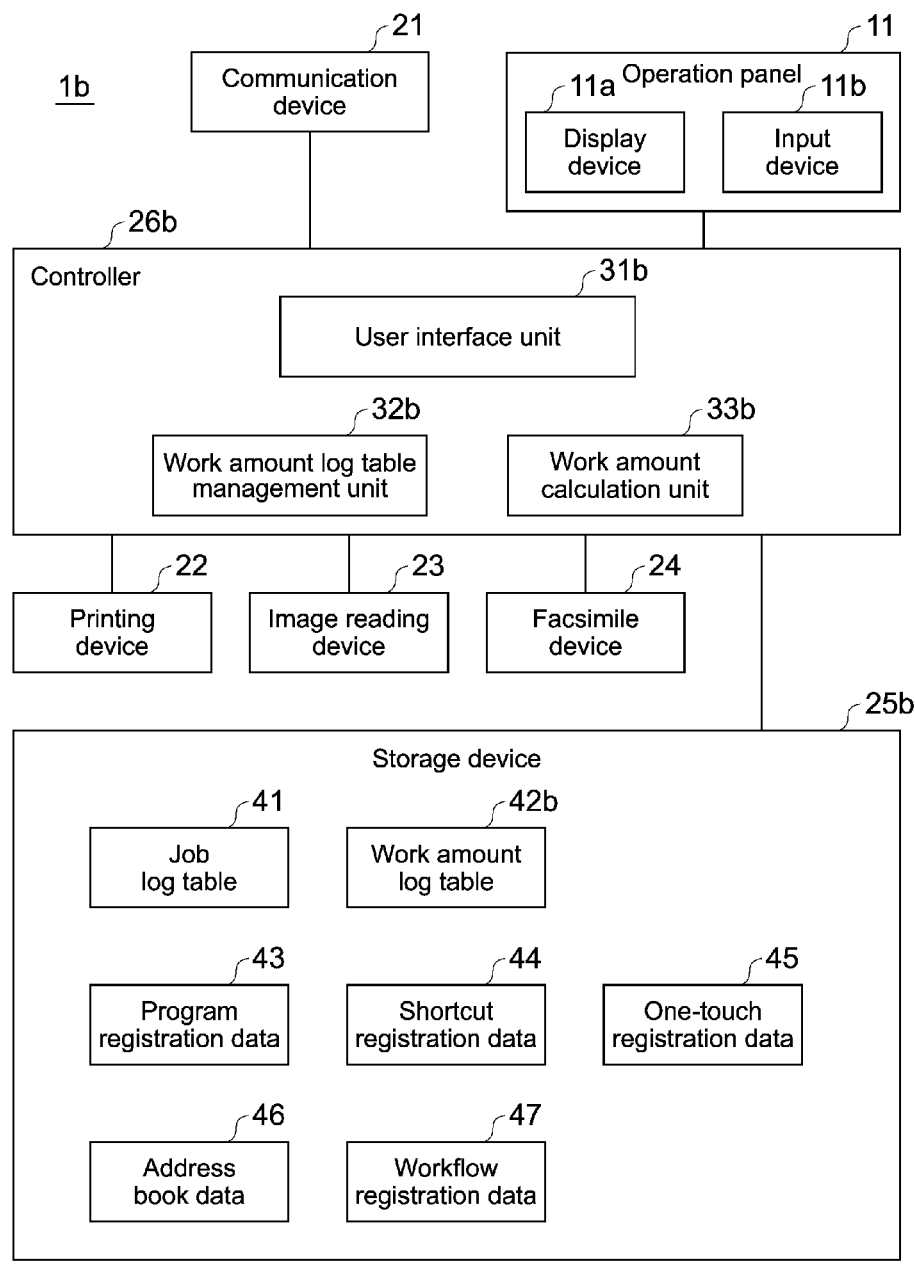
FIG. 9 is a diagram illustrating a functional block configuration of an image forming apparatus 1b according to a third embodiment.

Next, the structure of the image forming apparatus 1b according to the third embodiment will be described. FIG. 9 is a diagram illustrating a functional block configuration of the image forming apparatus 1b according to the third embodiment.

The structure of the image forming apparatus 1b is different from those of the embodiments described above in that the user interface unit 31b, the work amount log table management unit 32b, and the work amount calculation unit 33b that operate on the controller 26b can handle a workflow, an item of a device ID for identifying each image forming apparatus 1b is added to the work amount log table 42b stored in the storage device 25b, and workflow registration data 47 is added to the storage device 25b.

When a series of jobs is repeated for a number of times equal to or larger than a specific threshold value in the work amount log table 42b irrespective of whether the jobs are made in the single image forming apparatus 1b, the work amount calculation unit 33b extracts the repetition of the series of jobs and proposes a workflow as a substitutive user operation for substituting the extracted series of jobs.

It should be noted that the communication device 21 receives work amount logs transmitted from other image forming apparatuses 1b, and the work amount log table management unit 32b stores the received work amount logs in the work amount log table 42b together with the device IDs of the image forming apparatuses 1b that have transmitted the work amount logs.

It should be noted that a workflow key (not shown) for instructing execution of a registered workflow may be displayed on the display device 11a, and a predetermined workflow may be executed as the user presses the displayed workflow key.

The structure of the image forming apparatus 1b according to the third embodiment has been described heretofore.

Specific Example 1

Next, a specific example (1) of extracting a series of jobs from the work amount log table 42b and proposing it as one workflow to a user will be described. FIG. 10 is a diagram illustrating an example of the work amount log table 42b for extracting a series of jobs and proposing it as one workflow to a user. It should be noted that as is apparent since all the device IDs are the same, jobs executed in one image forming apparatus 1b are recorded in the work amount log table 42b shown in FIG. 10.

In FIG. 10, recorded as a series of jobs are a job of pressing a timestamp on a report that a user has created and saving it in a document box (work amount logs L1 to L3), a job of emailing the saved report to a boss (work amount logs L4 to L7), and a job of printing the transmitted report for filing (work amount logs L8 to L9).

When job setting operations that are the same as those of the series of jobs described above are recorded for the number of times equal to or larger than a specific threshold value, the work amount calculation unit 33b proposes registration of the series of jobs as a workflow to the user.

Heretofore, the specific example (1) of extracting a series of jobs from the work amount log table 42b and proposing it as one workflow to a user has been described.

Specific Example 2

Next, a specific example (2) of extracting a series of jobs from the work amount log table 42b and proposing it as one workflow to a user will be described. FIG. 11 is a diagram illustrating an example of the work amount log table 42b for extracting a series of jobs and proposing it as one workflow to a user. It should be noted that as can be seen from different device IDs, jobs executed in a plurality of image forming apparatuses 1b are recorded in the work amount log table 42b shown in FIG. 11.

In FIG. 11, recorded as a series of jobs are a job of faxing a sales report that a sales representative has created in a branch office to the image forming apparatus 1b (device ID "BBB") in a headquarters office (work amount logs L10 to L13), a job in which general affairs for sales personnel in the headquarters office save the received sales report in a document box (work amount logs L14 to L15), and a job of emailing the sales report that the general affairs for sales personnel in the headquarters office have saved to a senior sales director (work amount logs L16 to L19).

When job setting operations that are the same as those of the series of jobs described above are recorded for the number of times equal to or larger than a specific threshold value, the work amount calculation unit 33b proposes registration of the series of jobs as a workflow to the user.

It should be noted that in the example above, the work amount log table management unit 32b of the image forming apparatus 1b in the headquarters office transmits the work amount logs to the work amount log table management unit 32b of the image forming apparatus 1b in the branch office as a transmission source of the sales report. After that, the work amount log table management unit 32b of the image forming apparatus 1b in the branch office records the received work amount logs in the work amount log table 42b thereof together with appropriate device IDs.

Heretofore, the specific example (2) of extracting a series of jobs from the work amount log table 42b and proposing it as one workflow to a user has been described. It should be noted that when a series of jobs is extracted (specified) from the work amount log table 42b, it is possible to set a condition where the appearance orders of targets in the case of "JOB selection" are the same (e.g., "Box save", "Send", and "Box printing") and contents of other operation types included in the series of jobs are also the same.

(Processing Flow)

The processing flow of the image forming apparatus 1b according to the third embodiment is the same as those described above except that the series of jobs is executed via the plurality of image forming apparatuses 1b and a workflow is taken into account. Therefore, descriptions on the overlapping parts will be omitted.

It should be noted that in the case of the work amount log table 42 shown in FIG. 10 when the work amount calculation unit 33b calculates a time required for a user to make a setting operation before a job is executed, for example, the required time before a job is executed is calculated with operation times of all the operation types being 0 at the time a substitutive user operation for the workflow function is applied.

It should be noted that the operation aid function used in the third embodiment is a workflow function that enables setting values to be input to a plurality of setting items of a plurality of jobs by one user operation with respect to the workflow key and executes the plurality of jobs in a specific order, in addition to the function used in the first embodiment.

As described above, the image forming apparatus 1b according to the third embodiment includes: the display device 11a that displays an operation screen with respect to a user; the input device 11b that receives an input operation made by the user; the storage device 25; the work amount log table management unit 32b that specifies, for each job, an operation type and a required time of each of a series of user operations that has been made before executing the job, and stores the operation type and the required time in the storage device as a work amount log; and the work amount calculation unit 33b that reads out the work amount log from the storage device, specifies, based on the operation type in the work amount log, an operation that can be substituted by a workflow that uses an operation aid function registered in the storage device out of the series of user operations, and proposes the substitution of the specified operations by the workflow to the user.

The third embodiment has been described heretofore. In the third embodiment, even in the case of a task of executing a series of jobs via the plurality of image forming apparatuses 1b, the series of jobs can be handled as one workflow, and an appropriate substitutive user operation can be proposed to the user. In other words, substitutive operations can be proposed with respect to regular operations made via the plurality of image forming apparatuses 1b. As a result, a time required for a user to make a setting to instruct a series of process can be cut.

It should be noted that the embodiments described above are favorable examples of the present disclosure. The present disclosure is not limited to the embodiments described above and can be variously modified without departing from the gist of the present disclosure.

What is claimed is:

1. An image forming apparatus, comprising:
   a display device that displays an operation screen with respect to a user;
   an input device that receives an input operation made by the user;
   a storage device;
   a work amount log table management circuit that specifies, for each job, an operation type and a required time of each of a series of user operations that has been made before executing the job, and stores the operation type and the required time in the storage device as a work amount log; and
   a work amount calculation circuit that reads out the work amount log from the storage device, specifies, based on the operation type in the work amount log, operations that can be substituted by a workflow that uses an operation aid function registered in the storage device out of the series of user operations, and proposes the substitution of the specified operations by the workflow to the user; and
   a communication device communicable with other one or more image forming apparatuses,
   wherein:
   the communication device receives the work amount logs from the other one or more image forming apparatuses;
   the work amount log table management circuit stores identification information and the work amount logs of the image forming apparatus itself and the other one or more image forming apparatuses in the storage device; and
   the work amount calculation circuit
      reads out the work amount logs of the image forming apparatus itself and the other one or more image forming apparatuses,
      specifies, when a series of jobs is repeated for the number of times equal to or larger than a threshold value by a plurality of image forming apparatuses, the repetition of the series of jobs as a series of operations that can be substituted by an unregistered substitutive user operation, and
      proposes the substitution of the series of jobs by the workflow to the user.

2. The image forming apparatus according to claim 1, wherein the operation aid function includes
   enabling setting values to be input to a plurality of setting items of a plurality of jobs by one user operation with respect to a workflow key, and
   executing the plurality of jobs in a specific order.

3. The image forming apparatus according to claim 2, wherein the work amount calculation circuit calculates, when operations that can be substituted by the workflow are specified, a required time before a job is executed in a case where the specified operations are substituted by the workflow.

4. The image forming apparatus according to claim 3,
wherein the work amount calculation circuit calculates a
sum of a required time for operations other than the
specified operations and a required time for the workflow, as the required time before a job is executed in the
case where the specified operations are substituted by
the workflow.

5. The image forming apparatus according to claim 4,
wherein the work amount calculation circuit calculates a
difference between a required time before a job is
executed in a case where the specified operations are
not substituted by the workflow and the calculated
required time, and displays the difference on the display
device.

6. The image forming apparatus according to claim 5,
wherein the work amount calculation circuit displays,
when operations that can be substituted by the workflow are not specified, a notification to that effect on the
display device.

7. The image forming apparatus according to claim 6,
wherein the work amount calculation circuit
    specifies a series of operations that can be substituted
        by a substitutive user operation unregistered in the
        storage device at a time of ending a job,
    displays, on the display device together with the difference, an inquiry screen for inquiring the user
        whether to register the unregistered substitutive user
        operation, and
    additionally registers the substitutive user operation in
        the storage device when the input device detects an
        input operation indicating that the substitutive user
        operation is to be registered.

8. The image forming apparatus according to claim 7,
wherein the work amount calculation circuit
    specifies the number of times each of the series of user
        operations is made before the job is executed,
    specifies operations each of whose number of times is
        equal to or larger than a threshold value as the series
        of operations that can be substituted by the unregistered substitutive user operation, and
    does not specify an operation whose number of times is
        smaller than the threshold value as the series of
        operations that can be substituted by the unregistered
        substitutive user operation.

9. The image forming apparatus according to claim 8,
wherein the work amount calculation circuit
    specifies, when user operations of the same operation
        type are consecutively made for a predetermined
        number of times or more, the consecutive user operations of the same operation type as the series of
        operations that can be substituted by the unregistered
        substitutive user operation, and
    displays the inquiry screen for the user operations on
        the display device.

10. The image forming apparatus according to claim 9,
wherein the work amount calculation circuit
    specifies, when a required time for one user operation
        is equal to or larger than a predetermined threshold
        value, the user operation as the series of operations
        that can be substituted by the unregistered substitutive user operation, and
    displays the inquiry screen for the user operation on the
        display device.

* * * * *